United States Patent [19]

Peinado et al.

[11] Patent Number: 4,554,129
[45] Date of Patent: Nov. 19, 1985

[54] GAS-COOLED NUCLEAR REACTOR

[75] Inventors: Charles O. Peinado, La Jolla; Stanley L. Koutz, San Diego, both of Calif.

[73] Assignee: The United States of America as represented by the United States Department of Energy, Washington, D.C.

[21] Appl. No.: 359,161

[22] Filed: Mar. 17, 1982

[51] Int. Cl.⁴ .................. G21C 15/18; G21C 15/02
[52] U.S. Cl. .................. 376/298; 376/385; 376/389; 376/393; 376/406; 165/40
[58] Field of Search .......... 376/292, 295, 298, 299, 376/383, 385, 389, 390, 391, 393, 406; 165/40

[56] References Cited

U.S. PATENT DOCUMENTS

| | | | |
|---|---|---|---|
| 2,946,732 | 7/1960 | Wootton | 376/389 X |
| 2,997,435 | 8/1961 | Millar et al. | 376/385 X |
| 3,123,532 | 3/1964 | Michel | 376/381 X |
| 3,213,833 | 10/1965 | Cunningham et al. | 376/406 X |
| 3,226,300 | 12/1965 | Zmola et al. | 376/406 X |
| 3,312,596 | 4/1967 | Grain | 376/406 X |
| 3,325,374 | 6/1967 | Margen | 376/406 |
| 3,397,114 | 8/1968 | Deighton | 376/406 X |
| 3,401,082 | 9/1968 | Ammon et al. | 376/406 X |
| 3,461,034 | 8/1969 | Fortescue . | |
| 3,475,272 | 9/1969 | Fortescue et al. . | |
| 3,537,420 | 11/1970 | Chollet et al. | 376/295 X |
| 3,802,994 | 4/1974 | Forster et al. | 276/299 |
| 4,039,377 | 8/1977 | Andrieu et al. | 376/292 X |
| 4,099,554 | 7/1978 | Haese | 376/391 X |
| 4,113,559 | 9/1978 | Schweiger | 376/299 |
| 4,243,487 | 1/1981 | Schweiger | 376/298 |
| 4,291,750 | 9/1981 | Clyne et al. | 165/40 X |
| 4,299,660 | 11/1981 | Quade . | |
| 4,337,737 | 7/1982 | Pechner | 165/40 X |
| 4,382,908 | 5/1983 | Peterson | 376/299 |

FOREIGN PATENT DOCUMENTS 2623978 12/1977 Fed. Rep. of Germany ...... 376/299
2640786 3/1978 Fed. Rep. of Germany ...... 376/299
1120930 7/1968 United Kingdom ............... 376/406

Primary Examiner—Harold J. Tudor
Assistant Examiner—Daniel Wasil
Attorney, Agent, or Firm—Fitch, Even, Tabin & Flannery

[57] ABSTRACT

A gas-cooled nuclear reactor includes a central core located in the lower portion of a prestressed concrete reactor vessel. Primary coolant gas flows upward through the core and into four overlying heat-exchangers wherein stream is generated. During normal operation, the return flow of coolant is between the core and the vessel sidewall to a pair of motor-driven circulators located at about the bottom of the concrete pressure vessel. The circulators repressurize the gas coolant and return it back to the core through passageways in the underlying core structure.

If during emergency conditions the primary circulators are no longer functioning, the decay heat is effectively removed from the core by means of natural convection circulation. The hot gas rising through the core exits the top of the shroud of the heat-exchangers and flows radially outward to the sidewall of the concrete pressure vessel. A metal liner covers the entire inside concrete surfaces of the concrete pressure vessel, and cooling tubes are welded to the exterior or concrete side of the metal liner. The gas coolant is in direct contact with the interior surface of the metal liner and transfers its heat through the metal liner to the liquid coolant flowing through the cooling tubes. The cooler gas is more dense and creates a downward convection flow in the region between the core and the sidewall until it reaches the bottom of the concrete pressure vessel when it flows radially inward and up into the core for another pass. Water is forced to flow through the cooling tubes to absorb heat from the core at a sufficient rate to remove enough of the decay heat created in the core to prevent overheating of the core or the vessel.

8 Claims, 2 Drawing Figures

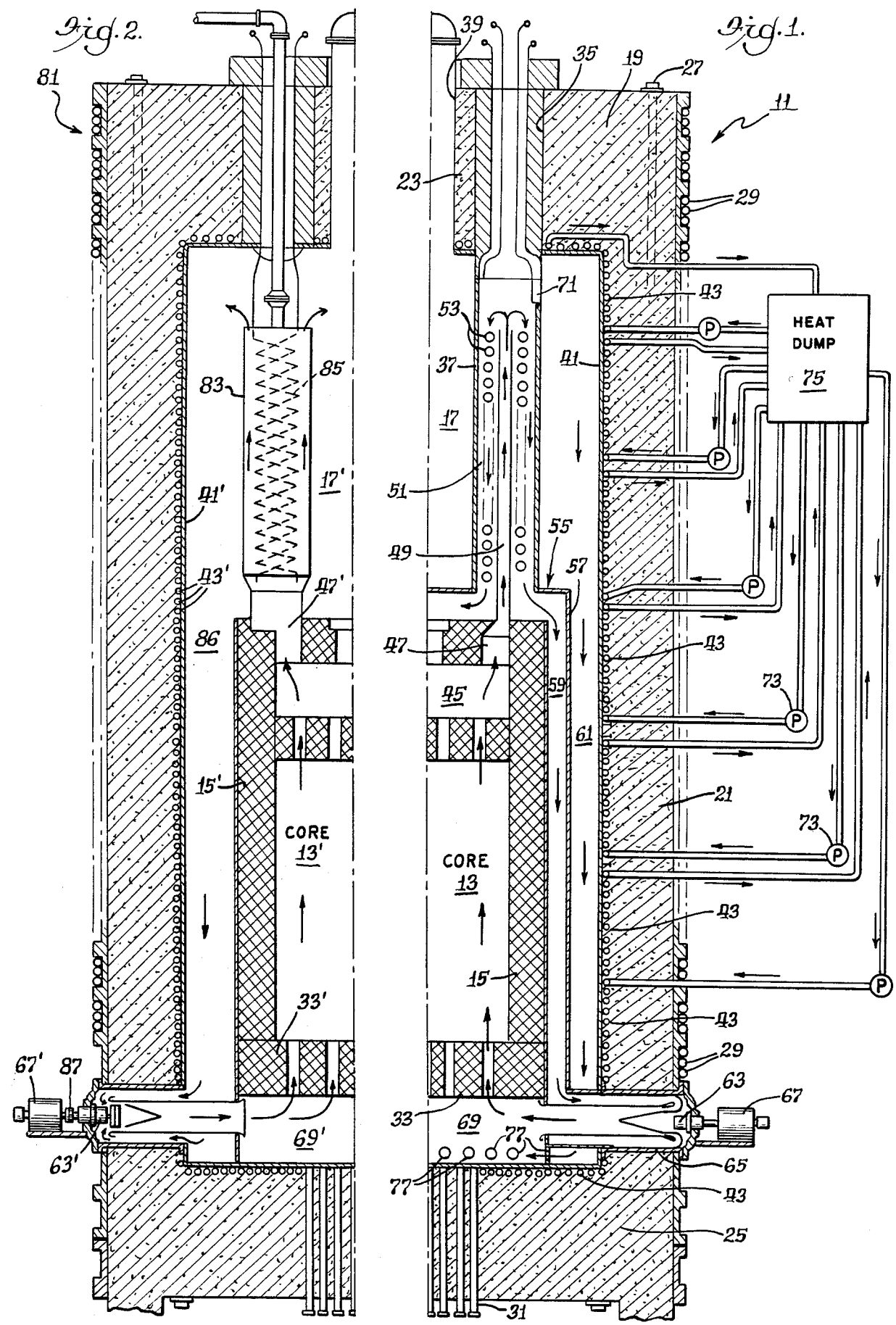

GAS-COOLED NUCLEAR REACTOR

The present invention relates to gas-cooled nuclear reactors and to methods for removal of heat generated in the core during emergency conditions when normal primary circulation has been lost.

BACKGROUND OF THE INVENTION

Gas-cooled nuclear reactors employ a coolant, such as helium or carbon dioxide, to remove the heat of fission from a nuclear reactor core and transfer it via heat-exchangers located within a concrete pressure vessel to a secondary fluid coolant, with a primary circulation system being used to achieve a desired continuous gas flow pattern within the concrete pressure vessel. If during an emergency the primary circulation systems fails to continue to operate, the reactor will be automatically shut down; the reactor core will continue to produce decay heat. The decay heat must be removed from the core during shutdown, and various systems have been proposed for this purpose. U.S. Pat. No. 4,299,660 issued Nov. 10, 1981 to Quade illustrates an emergency system wherein additional coolant circulators are actuated to circulate gas coolant into the concrete pressure vessel, through the core and out of the concrete pressure vessel to an auxiliary heat dump. Improved emergency shutdown systems for relatively small size reactors, i.e., about 100 to 400 MWt (megawatts) are desired.

SUMMARY OF THE INVENTION

The invention provides an emergency cooling system wherein a natural convection flow pattern is established within the concrete pressure vessel sufficient to extract a sufficient portion of the decay heat being created in the core during shutdown by heat transfer to a metal liner cooling system which covers the entire interior surface of the concrete pressure vessel within which the core and associated heat-exchangers are centrally located. Liquid coolant, such as water, is forced to flow through cooling tubes, which are attached to the concrete side of the metal liner at a desired pitch, at a sufficient rate to remove enough heat from the hot gas coolant to keep the core or vessel from overheating.

BRIEF DESCRIPTION OF THE DRAWINGS

FIG. 1 is a vertical sectional view of a gas-cooled nuclear reactor embodying various features of the invention; and FIG. 2 is an enlarged vertical sectional view of an alternative embodiment of a nuclear reactor embodying various features of the invention.

DESCRIPTION OF THE PREFERRED EMBODIMENTS

FIG. 1 illustrates a gas-cooled nuclear reactor 11 having a core 13 wherein the heat-producing nuclear fission reaction takes place, the core including a surrounding reflector 15. The core 13 is preferably circular in horizontal cross section and is centrally located within a lower section of a compartment or cavity 17 formed within a concrete pressure or containment vessel 19. The vessel 19 includes a sidewall 21 of hollow circular cylindrical shape, an upper end wall or slab 23 and a lower end wall or slab 25. The concrete pressure vessel 19 may be built in accordance with presently known technology for such structures and may include vertically extending prestressing tendons 27 and horizontally encircling circumferential cables 29, as described in detail in U.S. Pat. Nos. 3,461,034 and 3,475,272, the disclosures of which are incorporated herein by reference. Penetrations 31 for a control rod drive mechanism are provided in the lower end wall which are aligned with openings within the core support structure 33. A penetration 35 is provided in the upper end wall 23 above each heat-exchanger 37, which is located in overlying relationship to the core and arranged so that it lies within the vertically upward projection of the circumference of the core 13. A central penetration 39 provides access for refueling the core, if the core is of the prismatic or elongated fuel element type well known in the art. If the core is of the pebble-bed type, the penetration 39 may be used to supply replacement spherical fuel elements; however, a separate lower access penetration (not shown) would preferably be provided for removing spent fuel elements.

The interior compartment-defining surface of the concrete pressure vessel is covered by a metal liner 41 which extends for the full height of the vertical sidewall 21 and preferably also across the undersurface of the upper end wall 23 and the surface of the lower end wall 25. The liner is made of a suitable metal which has good resistance to high temperature and radiation damage and acceptable heat conductivity, such as a stainless steel alloy, and preferably forms a gas-tight barrier allowing superatmospheric pressure to be maintained therewithin. A plurality of liquid cooling tubes or piping 43 are attached, as by welding, to the exterior or concrete side of the metal liner and may be embedded in the concrete surface of the concrete pressure vessel. The tubes 43 are preferably made from carbon steel, or from the same metal alloy as the liner, and water or some other suitable liquid heat-transfer medium is forced through these cooling tubes during normal operations to cool the inside surfaces of the concrete pressure vessel to extract all of the decay heat during emergency shutdown operation to prevent overheating of the core or the vessel, as explained in detail hereinafter.

The core reflector 15 includes a horizontal wall portion having coolant flow passageways which extend upward to a hot gas plenum 45, and there are four openings or conduits 47 leading respectively from the plenum 45 to the bottom of one of the heat exchangers 37 which are supported in overlying relationship thereabove. The heat-exchangers 37 are preferably designed as steam generators so as to cause a secondary coolant, e.g., water, to boil within the heat-transfer tubing and turn to steam which may be used to operate a turbine for the ultimate generation of electricity. The heat-exchanger 37 is designed for a relatively standard uphill boiling operation, and the high temperature gas from the conduit 47 flows up through a central pipe 49 to the top of the heat exchanger and then downward through the surrounding annular passage 51 past the heat-transfer tubing 53 wherein boiling to generate steam occurs. The secondary fluid coolant accordingly enters the vessel through the penetration 35, travels downward to the bottom of the heat-exchanger 37 and then upward through the tubing 53 where boiling occurs, with the vapor preferably leaving through an interior concentric conduit through the penetration.

The core 13 is enveloped within a metal shroud 55 of a suitable metal alloy, such as stainless steel or the like. The shroud 55 has a vertical tubular section having a height such as to extend slightly above the top of the core and an interior diameter which is greater than the core diameter but less than the inside diameter of the metal liner, being disposed coaxially therebetween. Accordingly, the tubular wall portion 57 of the shroud divides the annular region between the core 13 and the concrete pressure vessel sidewall 21 into an inner passageway 59 and an outer passageway 61. The radial dimension of the outer passageway 61 is preferably larger than that of the inner passageway 59 for reasons explained hereinafter.

A pair of diametrically opposed rotary circulators 63 are located in diametrically opposed penetrations 65 in the sidewall of the concrete pressure vessel at just about the bottom thereof. The circulators 63 are driven by suitable electric motors 67 located outside of the concrete pressure vessel and take suction from the bottom of the interior passageway 59 at two diametrically opposed locations. The circulators 63 discharge radially inward into a cold gas plenum region 69 that is provided between the lower end wall 25 and the core support structure 33 which contains a plurality of passageways leading upward to the core region wherein the nuclear fission reaction takes place. Thus, during normal operation, the primary gas coolant flow is upward through the passageways provided in the reactor core 13 into the hot gas plenum 45, through the conduit 47 to the heat-exchanger, out the bottom of the heat-exchanger into the top of the shroud 55, down the inner passageway 59 adjacent the outer wall of the reflector 15, through the circulator and back into the cold gas plenum 69 for another pass upward. Accordingly, the primary gas coolant within the outer passageway 61 remains relatively stagnant.

In the unlikely event that an emergency should occur requiring shutdown of the reactor, and if the primary gas coolant circulation system is for some reason rendered inoperative so that the circulators 63 no longer draw coolant down the inner passageway 59, the emergency is automatically detected, and diversion valve means 71 located at the top of each of the heat-exchangers 37 are caused to open. These valves may be opened by gravity upon loss of primary coolant pressure differential across the circulator or by remote automatic control by the main reactor protective system. They may also have a backup control which will cause them to open upon the detection of an abnormal rise in temperature of the hot coolant gas at the top of the interior of the heat-exchanger 37. Opening of the valve means 71 during such an emergency allows the hot gas to divert radially outward into the region below the upper end wall and adjacent the metal liner 41 from which point a natural downward convection flow is established.

The arrangement of the liquid cooling tubes 43 is preferably such that there is redundancy, and accordingly a plurality of pumps 73 are provided, each of which is also preferably provided with a separate back-up diesel electric generator or battery power supply in case line-voltage should be lost as a result of the emergency. Each pump 73 is automatically started at time of detection of the emergency or as a result of rise in temperature or drop in pressure and supplies cooling water through one of the sections of the cooling tubes 43, and the hot water from each section enters a common heat pump 75 which may be an atmospheric air-cooled, heat-dissipation unit. If desired, it may be acceptable to pump water through the tubes 43 at a reduced rate during normal operation to lower the temperature of the concrete vessel. The pumps 73 draw their suction of cold water from the common heat dump 75. The pump 73, cooling tubes 43 and heat dump 75 are sized so that cooling water can be pumped through the cooling tube sections at a rate sufficient to withdraw heat, preferably at a rate at least about equal to the rate at which heat is being created on a decay basis within the core of the shutdown reactor. For example, for a 250 MW high-temperature gas-cooled reactor having a metal liner about 26 feet in diameter, cooling tubes 43 having an inner diameter of about 1.38 inches (1.25 in. diameter SCHEDULE 40) are welded to the concrete side of the metal liner on a 3 inch pitch or spacing, i.e., 3 inches between the centers of adjacent cooling tubes.

Because the gas coolant is in direct contact with the interior surface of the metal liner, excellent heat transfer occurs from the hot gas to the water being pumped through the cooling tubes 43 resulting in the prompt lowering of the gas temperature and consequent increase in its density. This sets up a very effective convection flow of gas downward along the bare metal surface of the liner 41 through the outer passageway 61 between the liner and the shroud. Preforation openings 77 are provided at about the bottom of the shroud 55 through which the descending annular column of relatively cool gas can flow radially inward to the plenum 69. If desired, back-flow prevention means can be provided at these openings 77 to minimize the back flow; however, during normal operation when the circulators 63 are discharging pressurized coolant into the plenum 69, there is minimal flow into the stagnant region 61 outside of the shroud 55. During such emergency operation, substantially all of the convection coolant flow is downward through the larger dimension and outer passageway 61 whereas relatively little gas flows within the narrower dimensioned inner passageway 59 within the shroud. The effectiveness of the overall design is such that there is no difficulty in removing all of the heat generated within the core during shutdown directly through the bare metal liner 41 into the water being pumped through the cooling tubes 43. The bare metal liner also facilitates radiation heat transfer from the higher temperature core. A temperature rise within the core above tolerable limits is avoided relying only upon the generally toroidal natural convection gas flow pattern within the reactor without the need to rely upon any mechanical gas circulation means. This results in preventing a significant fission product release from the nuclear fuel elements, thus providing a significant point of safety reliability which can be employed in high-temperature gas-cooled reactors up to about 400 MW which may operate at a normal core outlet hot gas temperature as high as 750° to 850° C.

Illustrated in FIG. 2 is a nuclear reactor 81 which closely resembles the reactor 11, just described, and which accordingly has similar component parts identified by prime numbers. The most significant difference between the reactors lies in the provision of down-hill boiling heat exchangers 83 wherein the hot gas from the conduit 47' makes only a single upward pass through the heat-exchanger which also serves as a steam generator. Accordingly, the secondary coolant water being supplied to the heat-transfer tubing is pumped downward through heat-transfer coils 85 so that boiling occurs near the bottom of the heat-exchanger. The gas coolant simply exits from the open top of the heat-exchanger 83 and flows generally radially outward to the metal liner 41' which covers the interior of the compartment 17'. Normal coolant flow pattern is thus downward along the metal liner through the relatively enlarged annular region 86 between it and the outer surface of the core reflector 15'. It may be desirable to also operate the pumps throughout normal operation in order to continuously circulate water through the cooling tubes 43' to cool the concrete pressure vessel because of the coolant flow path. The circulators 63' take suction from the bottom of this annular region and discharge radially inward to the plenum 69' located just below the passageways in the core support structure 33'. The circulators 63' is driven by a variable speed electric motor 67', and a magnetic clutch 87 may be optionally provided as a part of the drive shaft.

In this alternative embodiment, the emergency coolant path is substantially the same as the normal path when the primary circulation system is operating. Should an emergency occur so that shutdown of the reactor begins and the circulators 63' no longer operate to draw gas from the region 86, the generally toroidal pattern of gas flow continues as a result of the natural convection effect discussed hereinbefore. The continuous removal of heat through the bare metal liner 41' to the pumped liquid coolant continues to create an annular column of dense gas which, as a result of gravity, flows downward through the annular passageway 86 and continues to flow through the circulator openings into the plenum 69' and then back upward to the passageways in the hot core 13'. The optional provision of the magnetic clutch 87 allows the vaned circulator to be free-wheeling and thus present even less resistence to the radially inward flow of the more dense coolant therethrough. Accordingly, the reactor 81 incorporates the same inherent safety feature as the reactor 11 described hereinbefore in more detail.

If the reactor is accidentally depressurized and natural convection cannot be established, the reactor core is cooled by thermal radiation primarily to the metal liner and cooling tubes where the heat is removed by the liquid coolant. The diameter of the core is maintained sufficiently small so that acceptable maximum temperatures are not exceeded.

Although the invention has been illustrated and described with regard to two particularly preferred embodiments, it should be understood that changes and modifications as would be obvious to one having the ordinary skill in the art may be made without deviating from the scope of the invention which is set forth in the appended claims. For example, it would be possible to establish an overhead reservoir of water, such an elevated tank, to take the place of the pumps in an emergency. In such an instance, the cooling tubes could be supplied with water from the tank which could be allowed to boil so that the core heat would be ultimately removed in the form of steam. Particular features of the invention are emphasized in the claims which follow.

What is claimed is:

1. A gas-cooled nuclear reactor comprising
a concrete pressure vessel having a generally vertical cylindrical sidewall, an upper end wall and a lower end wall defining an internal compartment,
a tubular metal liner disposed adjacent to the interior wall of said concrete pressure vessel sidewall,
a nuclear fission reactor core located in a lower portion of said compartment having passageways therein for the flow of gas coolant from the bottom to the top thereof,
said core having a horizontal dimension less than the interior diameter of said concrete pressure vessel sidewall and being disposed therewithin to provide a generally annular region between said core and said sidewall,
a tubular shroud located in said generally annular region spaced outward from said core to create both an inner passageway between said core and said shroud and an outer passageway between said shroud and said metal liner, said inner and outer passageways normally communicating with each other at the bottom of said compartment,
heat-exchange mean located vertically above said core for transferring heat from a primary gas coolant flowing upward through said core to a secondary fluid coolant circulated therethrough, said heat-exchange means having a normal exit means near the bottom thereof and being constructed so that said gas coolant enters at the bottom and normally travels first upward and then downward therein,
conduit means for directing high temperature gas coolant from the top of said core to said heat-exchange means,
said exit means from the bottom of said heat-exchange means normally communicating said heat exchange means to said inner passageway,
circulator means normally taking suction from said inner passageway for drawing gas coolant from said normal exit from said heat-exchange means through said inner passageway and delivering said gas coolant to the bottom of said core for another pass upward therethrough, the coolant gas thereby being recirculated through a flow path entirely within said cylindrical internal compartment,
cooling tubes disposed in contact with the exterior surface of said metal liner,
said heat-exchange means also having emergency exit means near the top thereof, said emergency exit means being designed to open to a region above the core in direct contact with said metal liner and in communication with said outer passageway upon a predetermined rise in the temperature of said gas coolant,
said reactor being designed so that upon a rise in the exit temperature of said gas coolant from said core as a consequence of the failure in performance of said circulator means and resulting opening of said emergency exit means, there results a natural convection flow of gas coolant upward through said core, then to the top of said heat-exchange means and through said emergency exit means, then downward through said outer passageway along and in direct contact with the interior surface of said metal liner to the bottom of said core and then upward therethrough, and
means for circulating coolant liquid through said cooling tubes at a sufficient rate to withdraw enough heat to prevent said core and said concrete pressure vessel from overheating.

2. A nuclear reactor in accordance with claim 1 wherein the distance from said tubular shroud to the interior surface of said metal liner is greater than the distance from said shroud to said core.

3. A nuclear reactor in accordance with claim 1 wherein said heat-exchange means are located within the vertically upward projection of the periphery of said core and wherein said metal liner and cooling tubes extend upward along said sidewall at least to closely adjacent the level of the top of said heat exchange means.

4. A nuclear reactor in accordance with claim 1 wherein said circular means are rotary and are within the return path of said coolant to the bottom of said core during emergency conditions and wherein said circulator means is connected by magnetic clutch means to a motor drive so as to allow said circulator means to freely rotate when there is gas coolant flow therepast.

5. A gas-cooled nuclear reactor comprising a pressure vessel having a metal container including a generally vertical cylindrical sidewall, an upper end wall and a lower end wall, said metal container defining an internal compartment, a nuclear fission reactor core located in a lower portion of said compartment having passageways therein for the flow of gas coolant from the bottom to the top thereof, said core having a horizontal dimension less than the interior diameter of said sidewall and being disposed therewithin to provide a generally annular region between said core and said vertical sidewall, a tubular shroud located in said generally annular region spaced outward from said core to create both an inner passageway between said core and said shroud and an outer passageway between said shroud and said vertical sidewall, said inner and outer passageways normally communicating with each other at the bottom of said internal compartment, heat-exchange means located vertically above said core for transferring heat from a primary gas coolant flowing upward through said core to a secondary fluid coolant circulated therethrough, said heat-exchange means having a normal exit means near the bottom thereof and being constructed so that said gas coolant enters at the bottom and normally travels first upward and then downward therein, conduit means for directing high temperature gas coolant from the top of said core to said heat-exchange means, said exit means from the bottom of said heat-exchange means normally communicating said heat exchange means to said inner passageway, circulator means normally taking suction from said inner passageway for drawing primary gas coolant from said normal exit from said heat-exchange means through said inner passageway and delivering said primary gas coolant to the bottom of said core for another pass upward therethrough, said primary coolant gas thereby being recirculated through a flow path entirely within said cylindrical internal compartment, cooling tubes surrounding the exterior surface of said metal container, said heat-exchange means also having emergency exit means near the top thereof, said emergency exit means being designed to open to a region above the core in direct contact with said metal container and in communication with said outer passageway upon a predetermined rise in the temperature of said primary gas coolant, said reactor being designed so that upon a rise in the exit temperature of said primary gas coolant from said core as a consequence of the failure in performance of said circulator means and resulting opening of said emergency exit means, there results a natural convection flow of primary gas coolant upward through said core, then to the top of said heat-exchange means and through said emergency exit means, then downward through said outer passageway along and in direct contact with said vertical sidewall of said metal container to the bottom of said core and then upward therethrough, and means for circulating coolant liquid through said cooling tubes surrounding said metal container at a sufficient rate to withdraw enough heat through said vertical sidewall to prevent said core and said pressure vessel from overheating.

6. A nuclear reactor in accordance with claim 5 wherein the distance from said tubular shroud to the interior surface of said metal container is greater than the distance from said shroud to said core.

7. A nuclear reactor in accordance with claim 5 wherein said heat-exchange means are located within the vertically upward projection of the periphery of said core and wherein said metal container and cooling tubes extend upward along said sidewall at least to closely adjacent the level of the top of said heat exchange means.

8. A nuclear reactor in accordance with claim 5 wherein said circulator means are rotary and are within the return path of said coolant to the bottom of said core during emergency conditions and wherein said circulator means is connected by magnetic clutch means to a motor drive so as to allow said circulator means to freely rotate when there is gas coolant flow therepast.

* * * * *